US005543705A

United States Patent [19]

Uezono et al.

[11] Patent Number: 5,543,705

[45] Date of Patent: Aug. 6, 1996

[54] VOLTAGE REGULATING CIRCUIT AND PTC ELEMENT FOR AUTOMOTIVE VEHICLES

[75] Inventors: Kouichi Uezono; Yasuhiro Hara; Tsuyoshi Nakamura, all of Shizuoka-ken, Japan

[73] Assignee: Yazaki Corporation, Tokyo, Japan

[21] Appl. No.: 253,066

[22] Filed: Jun. 2, 1994

[30] Foreign Application Priority Data

Jun. 3, 1993 [JP] Japan ............................... 5-029777 U
Nov. 16, 1993 [JP] Japan ............................... 5-286849

[51] Int. Cl.[6] ............................... H02H 5/04

[52] U.S. Cl. ............................... 323/369; 361/106

[58] Field of Search ............................... 361/106–108, 361/56, 54, 57, 11; 323/369, 68, 69; 340/589

[56] References Cited

U.S. PATENT DOCUMENTS 4,437,696 6/1990 Yoshino ............................... 361/11
5,303,115 4/1994 Nayar et al. ............................... 361/106

FOREIGN PATENT DOCUMENTS 62-154521 7/1987 Japan .

*Primary Examiner*—Peter S. Wong
*Assistant Examiner*—Aditya Krishnan
*Attorney, Agent, or Firm*—Wigman, Cohen, Leitner & Myers, P.C.

[57] ABSTRACT

A voltage regulating circuit for automotive vehicles includes: a supply voltage; a load; and a Positive Temperature Coefficient ("PTC") resistance element connected in series between the supply voltage and the load, for regulating voltage applied from the supply voltage to the load creating by a voltage drop across the PTC element. The PTC element includes a PTC element body substance; electrode plates provided on both side surfaces of the PTC element body substance; connection terminals provided for the respective electrode plates; and a return portion provided for at least one of the electrode plates or the connection terminals, for adjusting resistance of the element.

18 Claims, 4 Drawing Sheets

VOLTAGE REGULATING CIRCUIT AND PTC ELEMENT FOR AUTOMOTIVE VEHICLES

BACKGROUND OF THE INVENTION

1. Field of the Invention

The present invention relates to a voltage regulating circuit and a PTC element suitable for use in automotive vehicles, for regulating a voltage applied to loads of electric circuits provided for the automotive vehicles.

2. Description of the Related Art

In electric circuits of an automotive vehicle, for instance, in the case of a head lamp (H-Lp) circuit of an automotive vehicle, the circuit wires are elongated to provide a voltage drop for a voltage applied from a battery to the head lamps (H-Lp) for protection and prevention of lamp deterioration. Depending upon the capacity of the alternator, the wire length of the head lamp circuit is usually determined after the head lamps have been actually mounted on the automotive vehicle, thus causing problems in that the manpower increases and further the weight and cost of the wires increase with increasing length.

Similarly, in the case of clearance (vehicle width) lamps, protection circuits are also provided to protect these lamps from an excessive voltage by arranging long wires on the output side of a relay and a fuse.

SUMMARY OF THE INVENTION

Accordingly, it is an object of the present invention to provide a voltage regulating circuit usable for any automotive vehicles in common and a Positive Temperature Coefficient (referred to hereinafter "PTC") element used with the voltage regulating circuit therefor, which can protect the circuits and circuit loads from deterioration while reducing the circuit wires in length and weight. Here, the PTC element is an element whose resistance increases abruptly at a certain temperature, so that it is possible to protect the circuits and the loads from an excessive current or an excessive voltage.

To achieve the above-mentioned object, the present invention provides a voltage regulating circuit for automotive vehicles, comprising: a supply voltage; a load; and a PTC element connected in series between said supply voltage and said load, for regulating voltage applied from said supply voltage to said load by a voltage drop across said PTC element.

In the voltage regulating circuit as described above, since the PTC element is connected in series between the voltage supply and the load to regulate the voltage applied from the voltage supply to the load due to a voltage drop across the PTC element, it is possible to effectively protect and prevent the circuit or the load from an over-current condition or an over-voltage, without use of any fuse. Further, there exist such advantages that the circuit wire can be reduced in weight and size; the voltage regulating circuit can be used in common for various automotive vehicles; and thereby the manufacturing cost thereof can be reduced.

Further, the present invention provides a PTC element, comprising: a PTC element body substance; electrode plates provided on both side surfaces of said PTC element body substance; connection terminals provided for said electrode plates, respectively; and a return portion provided for at least one of said electrode plates or said connection terminals, for adjusting resistance of said element.

Further, in the PTC element as described above, since the return portion is formed in any one of the electrode plates or the connection terminals, it is possible to freely adjust the resistance of the PTC element without modifying the thickness and the composition of the main body substance and further the external dimensions of the electrode plates.

DETAILED DESCRIPTION OF THE EMBODIMENTS

The embodiments of the present invention will be described hereinbelow with reference to the attached drawings.

Figure 1:
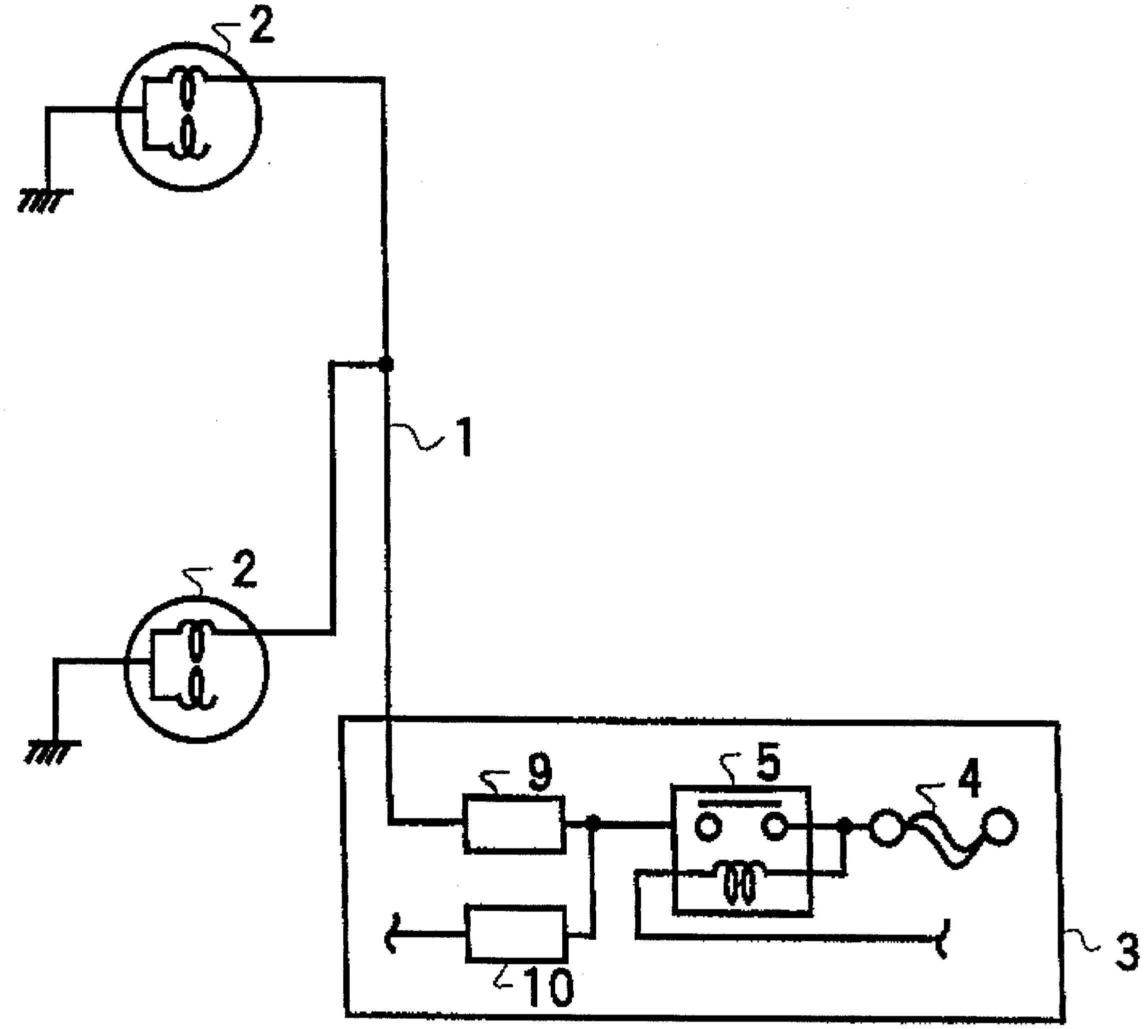
FIG. 1 is a circuit diagram showing a head lamp circuit, to which the voltage regulating circuit for automotive vehicles according to the present invention is applied.

FIG. 1 is a head lamp circuit to which the voltage regulating circuit according to the present invention is applied. In the drawing, two (right and left) head lamps 2 are connect to an electric junction box 3 through two wires 1. The electric junction box 3 includes a fusible link 4, a relay 5 and two Positive Temperature Coefficient (referred to hereinafter "PTC") elements 9 and 10. The PTC element 9 is provided for a high beam of the head lamps 2 and connected between the two head lamps 2 and the relay circuit 5. In the same way, the PTC element 10 is provided for a low beam of the head lamps 2 and connected between two head lamps 2 and the relay circuit 5. The fusible link 4, the relay 5 and the two PTC elements constitute a control circuit. In this circuit, the resistance of the head lamp (i.e., the load) is determined to be sufficiently larger than the steady-state resistance of the PTC element 9 or 10.

Figure 2A:
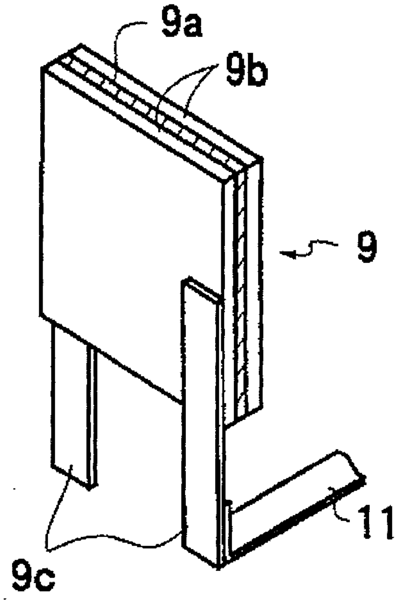
FIG. 2A is a perspective view showing a general form of a PTC element shown in FIG. 1.

FIG. 2A shows a general form of the PTC element 9 or 10. The PTC element is composed of a PTC element body substance 9*a*, two electrode plates 9*b* for sandwiching the element body substance 9*a*, and two connection terminals 9*c* connected to the electrode plates 9*b*, respectively. Further, the electrode plates 9*b* are soldered onto both-side bed surfaces (formed by nickel plating, for instance) of the element body substance 9*a*, respectively. Further, in FIG. 2A, the reference numeral 11 denotes a bus bar connected any one of the connection terminals 9*c*. This bus bar 11 is used as a member for constituting an internal circuit of the electric junction box 3, where necessary.

The PTC body substance 9*a* can be obtained by mixing crystal polymer (e.g., polyethylene) with conductive particles (e.g., carbon) at an appropriate mixture ratio. In this PTC element body substance, carbon particles are collected at amorphous portions of the crystal polymer so as to form a great number of conductive paths. Therefore, the PTC element is apparently of conductive element.

Figure 2B:
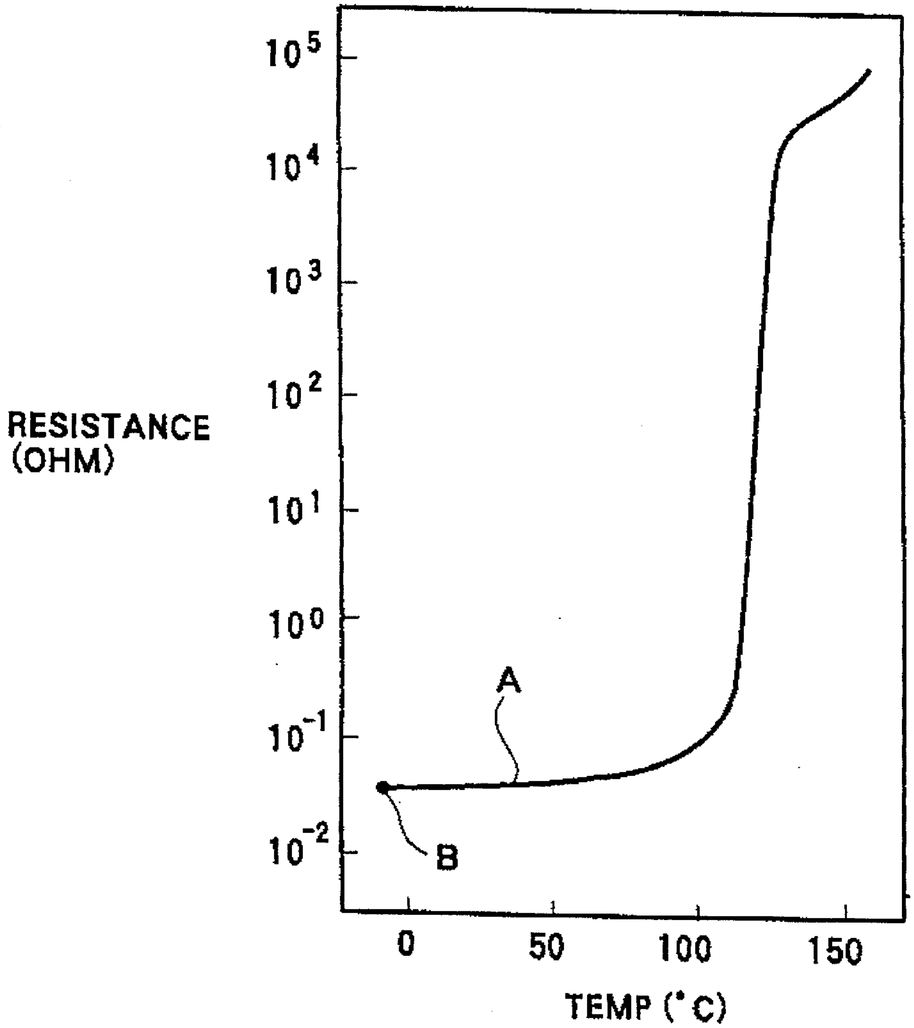
FIG. 2B is a graphical representation showing the characteristics between the resistance and the temperature of the PTC element shown in FIG. 2A.

When the PTC element is heated from the conductive state, The conductive paths are separated due to thermal expansion of the crystal portions of the polymer. Consequently, when the PTC element is heated to a certain temperature (near the melting point of the polymer), the resistance thereof increases abruptly at a "knee" point, as shown in FIG. 2B. Further, in FIG. 2B, the initial resistance value A of the characteristic curve A of the PTC element can be adjusted to various values during the manufacturing process.

By use of a rise of the resistance of the PTC element due to a rise of the temperature thereof, it is possible to use the PTC element as a fuse. When used as a fuse, since the PTC element is also provided with the voltage reduction function in addition to the function as the fuse, it is possible to eliminate the conventional wire elongation for voltage reduction, so that the circuit wire can be shortened and the wire weight can be reduced. In addition, the PTC element can be used in common for any of many automotive vehicles.

Figure 3A:
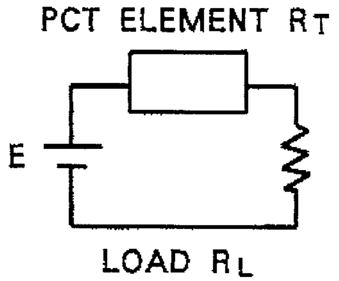
FIG. 3A is a circuit diagram showing a circuit which includes the PTC element.
Figure 3B:
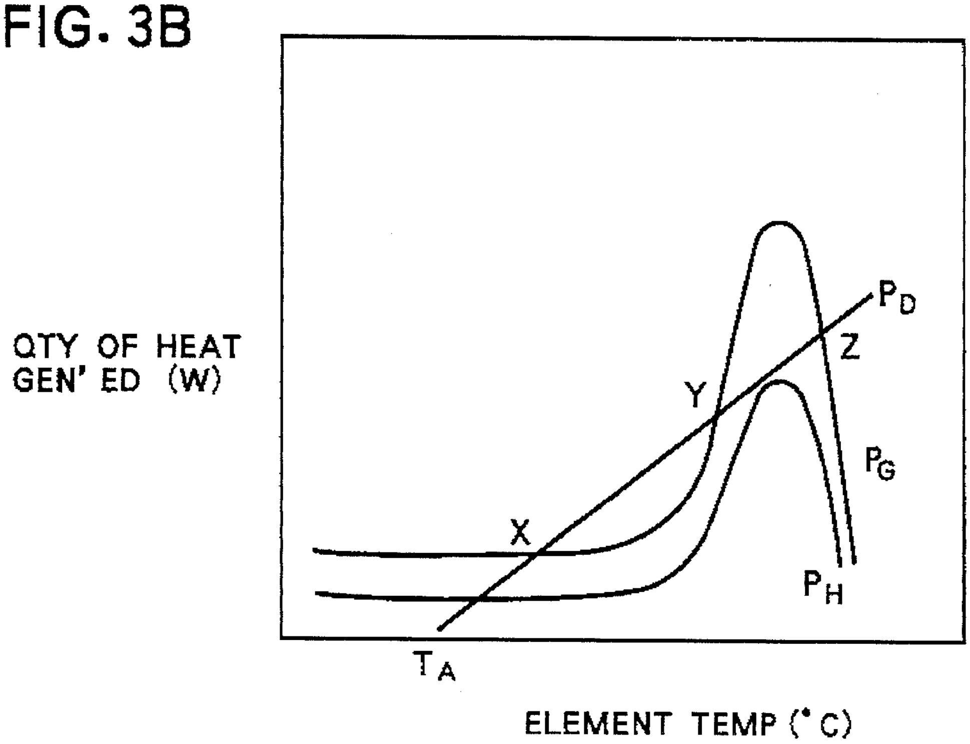
FIG. 3B is a graphical representation showing the characteristics between the quantity of heat generated by the PTC element and the temperature thereof.

When this PTC element is connected in series with a load in a circuit as shown in FIG. 3A, it is possible to protect the load from overheat due to over-current or over-voltage. In more detail, in FIG. 3A, when a constant voltage E is applied from a voltage supply E to a load and the resistance of the load RL is sufficiently larger than a steady-state resistance RT of the PTC element, the characteristics between the temperature (°C.) and the heat generated therefrom (W) can be represented as shown in FIG. 3B. In FIG. 3B, the characteristic curve PG having a maximal value point can be expressed as follows:

$$P_G = E^2 R_T / (R_T + R_L)^2$$

On the other hand, if the ambient temperature is TA, since the quantity of heat radiated from the element is proportional to a difference between the element temperature and the ambient temperature, the characteristics between the quantity of heat radiated from the element and the temperature thereof can be expresses as follows:

$$P_D = K(T - T_A)$$

Here, since the element is in an equilibrium state under the conditions that the quantity of heat radiated from the element is equal to that of heat generated thereby, it is possible to obtain two stable equilibrium points X and Z in the case where the, characteristic curve PG intersects the line PD at three different intersection points X, Y and Z, respectively.

Under the ordinary condition, the heat is in an equilibrium state at the point X. In an abnormal case, however, the equilibrium point is shifted from the point X to the point Z. In this condition, the resistance of the element increases, so that the current flowing through the circuit including the PTC element can be limited. Here, the shift from the equilibrium point X to that Z is referred to as trip phenomenon. Once the PTC element is shifted by the trip phenomenon, the circuit will not be returned to the original condition even if the abnormality is removed from the circuit. Therefore, in order to operate the circuit again under the normal condition, it is necessary to reduce the voltage so that the characteristics of the PTC element are shifted below the line PD (as shown by the curve PH) or to turn off once the voltage supply to cool the PTC element.

As described above, since the PTC element 9 or 10 is provided with the function as a fuse, when an excessive current flows through the circuit wire 1 shown in FIG. 1, it is possible to cut off the circuit current substantially. In addition, since the steady-state PTC element is provided with the function as a voltage drop, it is possible to shorten the circuit wire 1 to the shortest possible length, so that the wire harness can be reduced in weight and in dimension. Further, it is unnecessary to determine the length of the wire after the circuit has been once mounted on the respective automotive vehicle, so that the circuit can be used in common for any automotive vehicles.

Figure 4:
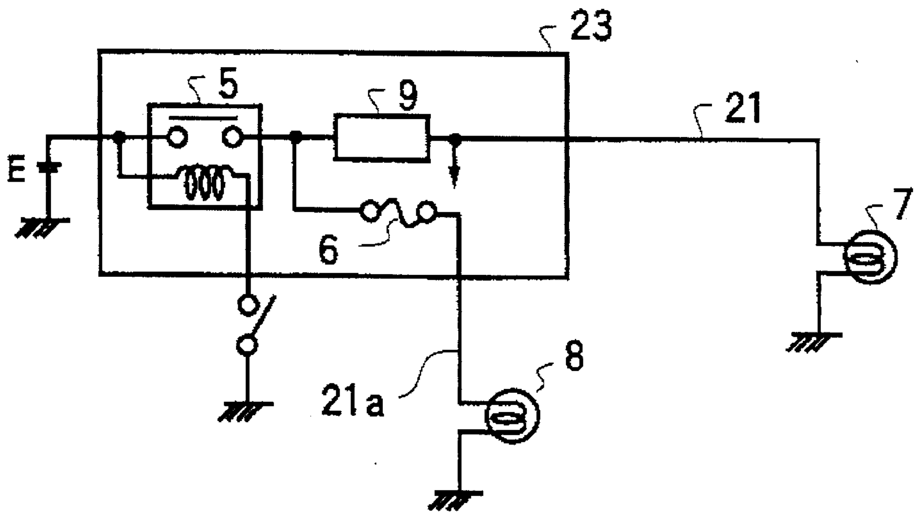
FIG. 4 is a circuit diagram showing a tail lamp circuit, to which the voltage regulating circuit according to the present invention is applied.

FIG. 4 shows a tail lamp circuit, to which the voltage regulating circuit according to the present invention is applied. In FIG. 4, an electric junction box 23 is connected to a clearance (vehicle width or height) lamp 7 through a wire 21 and further to a voltage source E and to a rear illumination lamp 8 through a wire 21*a*, respectively. The electric junction box 23 includes a relay 5, a PTC element 9 and a fuse 6. In the above-mentioned circuit, the circuit wire 21 is sufficiently shortened due to the presence of the PTC element 9. However, since the illumination lamp 8 is connected to the input side of the PTC element 9 through the fuse 6, even if the clearance lamp 7 is turned off due to the fuse function of the PTC element 9, the illuminating lamp 8 is kept lit up. Therefore, in this embodiment, the abnormality of the circuit may be not noticed by the driver.

Figure 5:
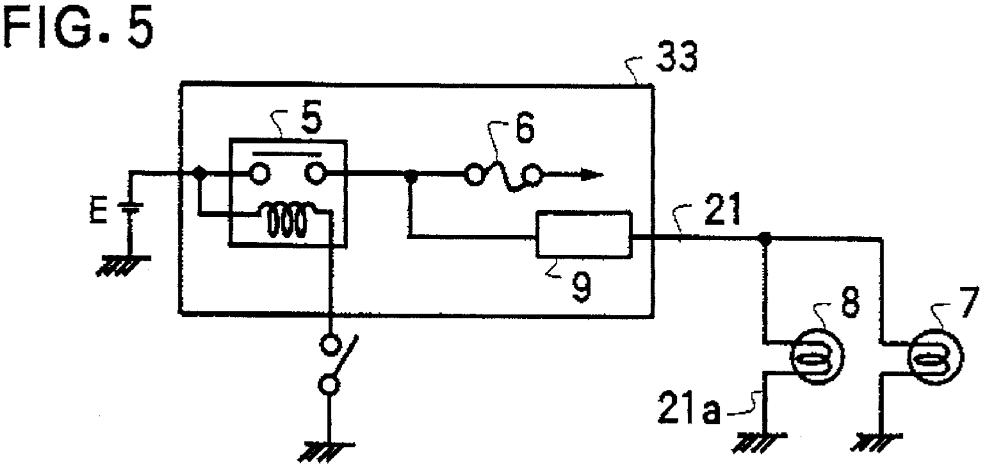
FIG. 5 is a circuit diagram showing another tail lamp circuit, to which the voltage regulating circuit according to the present invention is applied.

FIG. 5 shows another tail lamp circuit, to which the voltage regulating circuit according to the present invention is applied. In FIG. 5, an electrical junction box 33 is connected to a voltage source E and to a clearance (vehicle width or height) lamp 7 and a rear illumination lamp 8 both through a wire 21, respectively. The electric junction box 23 includes a relay 5, a PTC element 9 and a fuse 6. In the above-mentioned circuit, the clearance lamp 7 and the rear illumination lamp 8 are both connected in parallel to each other to electric junction box 33 through the PTC element 9. When the clearance lamp 7 is turned substantially off due to the presence of the PTC element 9, the rear illumination lamp 8 can be turned off simultaneously, it is therefore possible for the driver to notice the abnormality of the circuit.

Figure 6A:
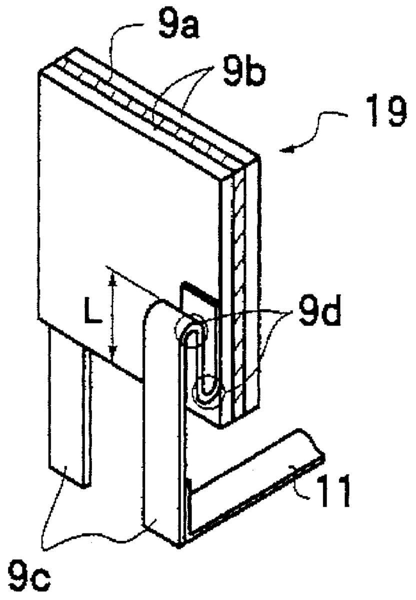
FIG. 6A is a perspective view showing anther form of the PTC element according to the present invention.
Figure 6B:
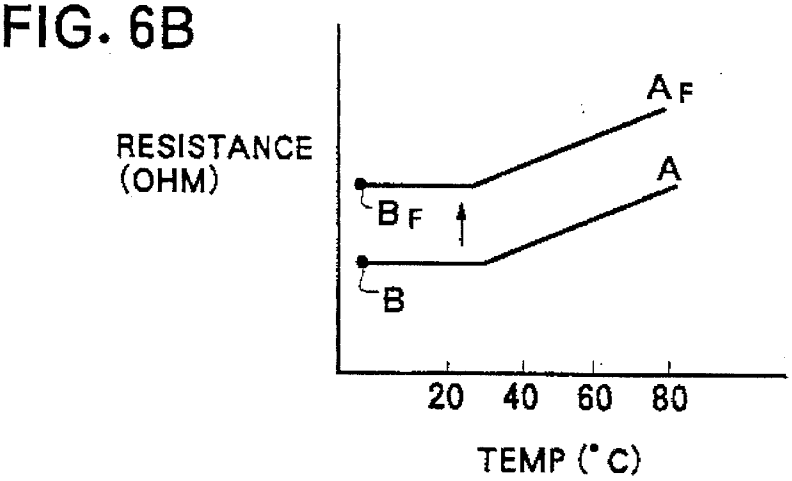
FIG. 6B is a graphical representation showing the characteristics between the resistance of the PTC element and the temperature thereof shown in FIG. 6A.

FIG. 6A shows another embodiment of the PTC element related to the present invention, and FIG. 6B shows the characteristics between the resistance and the temperature thereof. In this embodiment, the PTC element 19 is composed of an element body substance 9*a*, both-side electrode plates 9*b*, and two connection terminals 9*c*. In this embodiment, one of the connection terminals 9*c* is bent inward at a base portion thereof 9*d* so as to form a return portion 9*d*. In this embodiment, it is possible to increase the resistance of the PTC element 19 by a value corresponding to the resistance of the returned portion 9*d*. Further, the similar return portion can be formed by bending the end of any one of the electrode plates 9*b*, instead of the connection terminal 9*c*.

In this embodiment, since the resistance is larger (by a value corresponding to elongation of the returned portion 9*d*) than that of the PTC element 9 shown in FIG. 2A, it is possible to obtain the characteristic curve between the resistance and the temperature as shown by the upper broken line in FIG. 6B. That is, the PTC element 9 shown in FIG. 2A can be represented by the lower broken line in FIG. 6B (in which an initial resistance value is denoted by BF and a resistance-temperature line is denoted by A), the initial resistance value BF and the resistance-temperature line AF of this PTC element 19 shown in FIG. 6A are both shifted upward as shown.

In this embodiment, since the length L of the return portion **9*d* and the number of turns of the same return portion 9*d* can be determined freely, there exists the advantage that it is possible to easily adjust the inner resistance of the PTC element 19 at room temperature. Further, when the resistance of the PTC element 19 is not sufficient as compared with the resistance required for the circuit, it is possible to increase or finely adjust the resistance of the PTC element 19 without increasing the size of the main body substance 9*a* of the PTC element 19 or the external dimensions of the electrode plates 9*b*. The variation of the resistance, over the range of variation provided by the return portion 9*d*** is continuous; that is, the variation can be varied in an essentially infinite number of steps over its range.

Further, as already explained, although the current passed through the PTC element 19 is determined on the basis of the balance between the quantity of heat generated by the PTC element and the quantity of heat radiated therefrom, when the length of the return portion **9*d* is increased, since the quantity of heat radiated therefrom increases, it is possible to increase the current passed through the PTC element 19. This is because the return portion 9*d* dissipates more heat when the return portion 9*d* length is spaced apart from the body of PTC element 19**.

In the voltage regulating circuit for automotive vehicles according to the present invention, since the PTC element is connected in series between the voltage supply and the load to regulate the voltage applied to the load on the basis of a voltage drop across the PTC element, it is possible to effectively protect and prevent the circuit or the load from an over-current or an over-voltage, without the use of any fuse. Further, there exist such advantages that the circuit wire can be reduced in weight and size; the voltage regulating circuit can be used in common for various automotive vehicles; and thereby the manufacturing cost thereof can be reduced.

Further, in the PTC element according to the present invention, since the return portion is formed in any one of the electrode plates or the connection terminals, there exists such an advantage that the PTC element can be adjusted freely without modifying the thickness and the composition of the main body substance and further the external dimensions of the electrode plates.

What is claimed is:

1. A voltage regulating circuit for automotive vehicles having a supply voltage, comprising:

a load connected with said supply voltage; and a positive temperature coefficient element connected in series between said supply voltage and said load, for regulating voltage applied from said supply voltage to said load by a voltage drop across said positive temperature coefficient element, wherein said positive temperature coefficient element includes an adjustable resistance.

2. The voltage regulating circuit of claim 1, wherein said load comprises at least one lamp.

3. A positive temperature coefficient element, comprising:

a positive temperature coefficient element body substance;

electrode plates provided on both side surfaces of said positive temperature coefficient element body substance;

connection terminals provided for said electrode plates, respectively; and a return portion provided between one of said connection terminals and at least one of said electrode plates, for adjusting resistance between said connection terminals of said element.

4. A positive temperature coefficient element having a resistance value, comprising:

a positive temperature coefficient element body substance;

electrode plates provided on both side surfaces of said positive temperature coefficient element body substance;

connection terminals provided for said electrode plates, respectively; and a return portion provided for at least one of said connection terminals, for increasing the minimum resistance of said positive temperature coefficient element.

5. The voltage regulating circuit of claim 1, wherein the adjustable resistance is continuously variable over a range of resistance values.

6. The voltage regulating circuit of claim 3, wherein the adjustable resistance is continuously variable over a range of resistance values.

7. The voltage regulating circuit of claim 4, wherein the adjustable resistance is continuously variable over a range of resistance values.

8. The voltage regulating circuit of claim 1, wherein said load is a first load having first and second load components in respective first and second housings, and said positive temperature coefficient element is a first positive temperature coefficient element, further including a second load having first and second load components in said respective first and second housings, and a second positive temperature coefficient element, wherein said first positive temperature coefficient element is connected in series with said first load and said second positive temperature coefficient element is connected to said second load.

9. The voltage regulating circuit of claim 8, wherein each of said first and second loads comprises a lamp, and each of said first and second load components comprise first and second lighting circuits inside each respective lamp.

10. The voltage regulating circuit of claim 8, further including a junction box housings a fusible link, said first and second positive temperature coefficient elements, and a relay connected to selectively switch a current from said fusible link through said first and second loads.

11. The voltage regulating circuit of claim 1, wherein said positive temperature coefficient element further includes an adjustable heat dissipation surface.

12. The voltage regulating circuit of claim 3, wherein said positive temperature coefficient element further includes an adjustable heat dissipation surface.

13. The voltage regulating circuit of claim 4, wherein said positive temperature coefficient element further includes an adjustable heat dissipation surface.

14. The voltage regulating circuit of claim 11, wherein said adjustable resistance and said adjustable heat dissipation surface are formed by the same element such that increasing the resistance thereof increases the heat dissipation of the positive temperature coefficient element.

15. The voltage regulating circuit of claim 12, wherein said adjustable resistance and said adjustable heat dissipation surface are formed by the same element such that increasing the resistance thereof increases the heat dissipation of the positive temperature coefficient element.

16. The voltage regulating circuit of claim 13, wherein said adjustable resistance and said adjustable heat dissipation surface are formed by the same element such that increasing the resistance thereof increases the heat dissipation of the positive temperature coefficient element.

17. The voltage regulating circuit of claim 2, wherein said at least one lamp includes an incandescent lamp.

18. The method of adjusting a voltage regulating circuit for a vehicle lamp circuit, comprising:

providing a supply voltage source;

providing a lamp circuit current load;

providing a positive temperature coefficient element having a return portion for adjustment of the resistance of said positive temperature coefficient element;

connecting the source, load, and positive temperature coefficient element in series;

adjusting the minimum internal resistance of the positive temperature coefficient element to accommodate one of an overvoltage and overcurrent condition in said lamp circuit.

* * * * *